United States Patent
Geddes et al.

(10) Patent No.: US 12,092,594 B2
(45) Date of Patent: Sep. 17, 2024

(54) MEASUREMENT OF METAL OR ALLOY COATING

(71) Applicant: Schlumberger Technology Corporation, Sugar Land, TX (US)

(72) Inventors: Jill F. Geddes, Cambridge (GB); Trevor Lloyd Hughes, Cambridge (GB); Evgeny Borisovich Barmatov, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 288 days.

(21) Appl. No.: 17/756,917

(22) PCT Filed: Nov. 18, 2020

(86) PCT No.: PCT/US2020/060954
§ 371 (c)(1),
(2) Date: Jun. 6, 2022

(87) PCT Pub. No.: WO2021/118773
PCT Pub. Date: Jun. 17, 2021

(65) Prior Publication Data
US 2023/0018020 A1 Jan. 19, 2023

Related U.S. Application Data

(60) Provisional application No. 62/947,862, filed on Dec. 13, 2019.

(51) Int. Cl.
*G01N 23/223* (2006.01)
*G01B 15/02* (2006.01)

(52) U.S. Cl.
CPC ........... *G01N 23/223* (2013.01); *G01B 15/02* (2013.01); *G01N 2223/076* (2013.01);
(Continued)

(58) Field of Classification Search
CPC .............. G01N 23/22; G01N 23/223; G01N 2223/076; G01N 2223/0763; G01N 2223/507; G01N 2223/61; G01N 2223/633
(Continued)

(56) References Cited

U.S. PATENT DOCUMENTS 3,056,284 A 10/1962 Marsh et al.
3,764,805 A * 10/1973 Alley .................. G01N 23/223
378/48

(Continued)

FOREIGN PATENT DOCUMENTS

EP 2138832 A1 12/2009
KR 20120069367 A 6/2012
(Continued)

OTHER PUBLICATIONS

International Search Report and Written Opinion in International Patent Application No. PCT/US2020/063730, dated Mar. 15, 2021, 8 pages.

(Continued)

*Primary Examiner* — Allen C. Ho
(74) *Attorney, Agent, or Firm* — Jeffrey D. Frantz

(57) ABSTRACT

A method for measuring average thickness of a metal or alloy coating on a metal or alloy substrate using an X-ray fluorescence (XRF) spectrometer is used when the coating has an uneven surface at different distances from a measurement window of the XRF spectrometer. The method includes measuring elemental composition of the coating or substrate using the XRF spectrometer and obtaining the average thickness of the coating using a calibration relationship between coating thickness and elemental composition of the coating or substrate. The metal or alloy coating may be a metal or alloy coating of a plurality of outer armor wires (Continued)

US 12,092,594 B2

Page 2 wrapped around a cable. The method may be used to analyze coating thickness changes over time or along the length of the cable, or to analyze a corrosive environment in order to choose optimal material for a metal or alloy coating.

16 Claims, 9 Drawing Sheets

(52) U.S. Cl.
CPC ... *G01N 2223/507* (2013.01); *G01N 2223/61* (2013.01); *G01N 2223/633* (2013.01)

(58) Field of Classification Search
USPC ..................................................... 378/44–50
See application file for complete search history.

(56) References Cited

U.S. PATENT DOCUMENTS

| | | | | |
|---|---|---|---|---|
| 3,984,679 A * | 10/1976 | Lublin | ................ | G01N 23/223 378/45 |
| 4,495,558 A | 1/1985 | Cath et al. | | |
| 4,577,338 A | 3/1986 | Takahashi et al. | | |
| 4,669,310 A | 6/1987 | Lester | | |
| 5,274,688 A * | 12/1993 | Grodzins | ............ | G01N 23/223 378/45 |
| 5,325,416 A * | 6/1994 | Saito | ................... | G01N 23/223 378/50 |
| 5,396,529 A * | 3/1995 | Grodzins | ............ | G01N 23/223 378/45 |
| 5,461,654 A * | 10/1995 | Grodzins | ............ | G01N 23/223 378/45 |
| 5,657,363 A * | 8/1997 | Hossain | .............. | G01N 23/223 378/45 |
| 6,012,325 A * | 1/2000 | Ma | ..................... | G01N 15/0618 73/24.02 |
| 6,040,198 A * | 3/2000 | Komiya | ................. | G01N 23/20 378/45 |
| 6,111,929 A * | 8/2000 | Hazlett | ................ | G01N 23/223 378/45 |
| 6,477,227 B1 * | 11/2002 | Kaiser | ................. | G01N 23/223 378/45 |
| 6,631,177 B1 * | 10/2003 | Haszler | ................ | G01N 23/223 378/50 |
| 6,810,106 B2 * | 10/2004 | Sato | .................... | G01N 23/223 378/50 |
| 7,119,283 B1 * | 10/2006 | Varkey | ................ | H01B 7/2806 174/102 R |
| 7,259,331 B2 * | 8/2007 | Sridhar | ............... | H01B 7/2806 174/126.1 |
| 7,294,787 B2 * | 11/2007 | Varkey | ................ | H01B 7/2806 174/102 R |
| 7,586,042 B2 * | 9/2009 | Varkey | ................ | H01B 13/141 174/102 R |
| 7,702,067 B2 * | 4/2010 | Grodzins | ............ | G01N 23/223 378/45 |
| 8,155,268 B2 * | 4/2012 | Pesce | ................... | G01N 23/223 378/45 |
| 8,229,064 B2 * | 7/2012 | Grodzins | ............ | G01N 23/223 378/45 |
| 8,515,009 B1 * | 8/2013 | Piorek | ................. | G01N 23/223 378/50 |
| 8,855,809 B2 * | 10/2014 | Spencer | ............... | G01N 23/083 378/53 |
| 9,244,027 B2 * | 1/2016 | Connors | ............. | G01N 23/223 |
| 9,343,193 B2 | 5/2016 | Chen et al. | | |
| 9,446,565 B2 * | 9/2016 | Hughes | ................ | C23C 28/021 |
| 9,568,375 B2 | 2/2017 | Bliss et al. | | |
| 9,581,934 B2 | 2/2017 | Ito et al. | | |
| 11,143,605 B2 * | 10/2021 | Yun | ................... | G01N 23/2209 |
| 11,499,927 B2 * | 11/2022 | Kinugasa | ............ | G01N 23/223 |
| 2002/0012418 A1 | 1/2002 | Sato | | |
| 2010/0189215 A1 | 7/2010 | Grodzins et al. | | |
| 2010/0272232 A1 | 10/2010 | Pesce et al. | | |
| 2012/0257716 A1 | 10/2012 | Grodzins | | |
| 2013/0079918 A1 | 3/2013 | Spencer et al. | | |
| 2013/0202084 A1 | 8/2013 | Piorek et al. | | |
| 2013/0322595 A1 | 12/2013 | Connors | | |
| 2017/0001415 A1 | 1/2017 | Hughes et al. | | |
| 2017/0219455 A1 | 8/2017 | Mangali et al. | | |

FOREIGN PATENT DOCUMENTS

| | | |
|---|---|---|
| KR | 20170140855 A | 12/2017 |
| WO | 2015020530 A2 | 2/2015 |
| WO | 2015200112 A1 | 12/2015 |
| WO | 2017007499 A1 | 1/2017 |
| WO | 2021118966 A1 | 6/2021 |

OTHER PUBLICATIONS

International Preliminary Report on Patentability in International Patent Application No. PCT/US2020/063730, dated Jun. 23, 2022, 7 pages.

Al-Aithan, G. H. et al., "A Mechanistic Erosion-Corrosion Model for Predicting Iron Carbonate (FeCO3) Scale Thickness in a CO2 Environment with Sand", NACE Corrosion paper 3854, 2014, 15 pages.

ASTM B 487, "Test Method for Measurement of Metal and Oxide Coating Thickness by Microscopical Examination of Cross Section", ASTM, West Conshohocken, PA, 2013, 4 pages.

Chesney et al., "Nondestructive thickness gaging method for thin layers using x-ray fluorescence", 39th Materials Evaluation Conference, 1979, 13 pages.

Dill et al., "Coating thickness measurement of thin gold and palladium coatings on printed circuit boards using x-ray fluorescence", Circuit World, 2011, pp. 20-26, vol. 37, Issue 2.

Fiorini et al., "Determination of the thickness of coatings by means of a new XRF spectrometer", X-ray Spectrometry, 2002, pp. 92-99, vol. 31, Issue 1.

Hollis et al., "Spatial mapping of plasma sprayed coating thickness using x-ray fluorescence", Proceedings of the International Thermal Spray Conference, 2015, 7 pages.

Ida et al., "Analysis of painted steel by a hand-held x-ray fluorescence spectrometer", Spectrochimica Acta Part B, 2005, pp. 249-252, vol. 60, Issue 2.

Karimi et al., "Thickness measurement of coated Ni on brass plate using Kα/Kβ ratio by XRF spectrometry", X-ray Spectrometry, 2009, pp. 234-238, vol. 38, Issue 3.

Lopes et al., "Thickness determination of gold layer on preColumbian objects and a gilding frame, combining XRF and PLS regression", X-ray Spectrometry, 2016, pp. 344-351, vol. 45, Issue 6.

Mazuritskiy et al., "SEM and XRF Spectroscopy Methods for Studying and Controlling the Surface Morphology of Metalpolymer Films", Journal of Surface Investigation. Xray, Synchrotron and Neutron Techniques, 2014, pp. 767-774, vol. 8, No. 4.

Meskauskas, A., "Determination of Thickness and Density of Ultra Thin Iron Films by Grazing Angle Incidence X-ray fluorescence", Materials Science, 2008, pp. 79-81, vol. 14, No. 1.

Prabhoo, B. et al., "Use of ellipsometry and gravimetry to develop calibration standards for measuring silicone coat weight and thickness with x-ray fluorescence spectroscopy", Surface and Interface Analysis, 2000, pp. 341-345, vol. 29, Issue 5.

Prasad M.S., et al., Rapid on-site measurement of coating thickness of galvanized sheets by XRF technique at ISCo, Transactions of the Indian Institute of Metals, 1987, pp. 355-360, vol. 40, No. 4.

Thermo Scientific, "At Line Coating Thickness and Plating Bath Analysis Using Handheld XRF", Apr. 2015, 4 pages.

Langill, T.J., "Inspection of hot dip galvanized articles", Corrosion, paper No. 01428, 2001, 8 pages.

Barbosa, C.F., "A Simple Formula for Calculating the Coating Thickness of Galvanized Steel Wires", IEEE Transactions on Magnetics, 2014, 7 pages, vol. 50, Issue 7.

(56) References Cited

OTHER PUBLICATIONS

International Search Report and Written Opinion in International Patent Application No. PCT/US2020/060954, dated Apr. 2, 2021, 13 pages.
International Preliminary Report on Patentability in International Patent Application No. PCT/US2020/060954, dated Jun. 23, 2022, 9 pages.
Fess, S., "XRF as a method for measuring coat thickness of various conversion coatings on steel or aluminum," Steel Properties and Applications Conference, 2007, 14 pages.
Office Action issued in U.S. Appl. No. 17/757,096 dated Mar. 7, 2024, 18 pages.
East et al., "Analytical techniques to characterize scales and deposits", Mineral scales and deposits, pp. 681-699 (Year: 2015).
Butt et al., "Idenfication of scale deposits through membrane autopsy", Desalination, vol. 101, pp. 219-230 (Year: 1995).

* cited by examiner

MEASUREMENT OF METAL OR ALLOY COATING

CROSS-REFERENCE TO RELATED APPLICATIONS

This application is a 371 National Stage Filing of International Patent Application No. PCT/US2020/060954, filed Nov. 18, 2020, and titled "Measurement of Metal or Alloy Coating", which claims the benefit of, and priority to, U.S. Patent Application No. 62/947,862, filed Dec. 13, 2019, and titled "Measurement of Metal or Alloy Coating". Each of the foregoing applications is expressly incorporated herein by this reference in its entirety.

BACKGROUND

Armor wires stranded around the exterior of a cable have a range of functions including providing strength, abrasion resistance, erosion resistance, and crushing resistance for the cable. Corrosion of armor wires may be a concern when the cable is exposed to a corrosive environment, such as in the oil and gas industry for wireline or artificial lift wires where certain corrosive downhole environments may expose armor wires on cables to high temperatures and pressures, highly saline brines, oxygenated conditions, or acidic gases such as $CO_2$ and $H_2S$.

To inhibit corrosion and protect the armor wires, a metal or alloy coating can be applied. Such armor wires can include a metal or alloy coating on a metal or alloy substrate. The armor wire substrate may include, for instance, a variety of steels, including galvanized carbon steel. Example coatings may include zinc or zinc alloy.

The metal or alloy coating provides the armor wires with some protection from corrosion, but under certain corrosive environments the zinc or other coating will corrode. Such corrosion will gradually expose the steel substrate to the corrosive environment, which results in further, often localized, corrosion.

X-ray fluorescence (XRF) has been used to characterize non-metallic coatings such as paint and silicone. Further XRF measurement methods have also been used to evaluate the thickness of metal or metal-containing coatings having a flat surface.

For example, "At Line Coating Thickness and Plating Bath Analysis Using Handheld XRF" published in Thermo Scientific Niton XL3t XRF Analyzers, 2015 discusses the use of a handheld XRF analyzer for measuring the coating thickness of samples, including large or irregularly shaped samples and small diameter wiring or tubing. This article contemplates, however, large or irregularly shaped samples having a flat surface. Similarly, the small diameter wiring or tubing measured also have a substantially flat surface such that the distance from the measured surface of the wiring or tube to the XRF measurement window is substantially constant.

BRIEF SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth. The scope of this disclosure is defined by the accompanying claims.

The inventors of the present application have unexpectedly discovered that X-ray fluorescence (XRF) spectrometry can be used to accurately measure average thickness of a metal or alloy coating on a metal or alloy substrate, even when the metal or alloy coating has an uneven surface with different distances from a measurement window of the XRF spectrometer, for example a metal or alloy coating of outer armor wires wrapped around a cable.

The present disclosure provides a non-destructive method for quantifying metal or alloy coating thickness and changes in metal or alloy coating thickness with time using XRF measurements on a sample with substantially uneven surface, including wires in a wire bundle and outer armor wires on a stranded cable.

The method may be repeated for monitoring metal or alloy loss, e.g., thinning of the Zinc coating due to corrosion, along the length of a cable so that decisions can be made as to when and where the cable length should be cut due to excessive metal or alloy loss or when the outer armor wires should be replaced.

The inventors of the present disclosure also devised a method for accurately measuring metal or alloy coating thickness in the presence of mud or other deposits on the coating surface using a calibration relationship between coating thickness and the ratio between the concentration of an element in the coating and the concentration of an element in the substrate.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 illustrates an individual outer armor wire indicating directions of XRF measurements;

FIG. 2 is a graph showing an example of a calibration relationship between coating thickness and an elemental composition;

DETAILED DESCRIPTION

Figure 1:
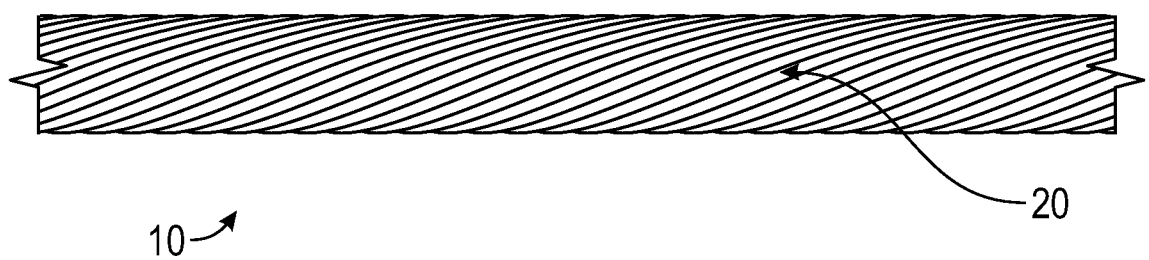
FIG. 1-1 is an illustration of a plurality of outer armor wires wrapped around a cable.

The ensuing description provides a description of some example embodiments, and is not intended to limit the scope, applicability, or configuration of the claims. Rather, this description is to explain some example embodiments consistent with aspects of the present disclosure and to provide those skilled in the art with an enabling description for making and using illustrative embodiments. Various changes may be made in the function and arrangement of elements without departing from the scope of the description and appended claims.

Embodiments of this disclosure relate generally to measuring average thickness of a metal coating having an uneven surface using an X-ray fluorescence (XRF) spectrometer. For instance, a non-destructive method may be used to measure average thickness of a coating of outer armor wires wrapped around a cable using an XRF spectrometer. The coating may include or be made of a metal or alloy.

Some aspects of the present disclosure relate to a method for measuring average thickness of a metal or alloy coating on a metal or alloy substrate using an XRF spectrometer when the metal or alloy coating has an uneven surface resulting in different distances between the sample and a measurement window of the XRF spectrometer. The distances from the measurement window and different points on the uneven surface may be substantially different. The uneven surface may be a concave surface or a convex surface, a wavy or undulating surface, or may have other surface shapes that cause the distances to vary. In some cases, the uneven surface is of an irregular shape. Additionally, the uneven surface may be smooth or textured. An example of an uneven surface includes a metal or alloy coating of outer armor wires wrapped around a cable. The armored cable may, for instance, have a generally circular cross-section as a result of a curved outer surface. Because of the curved surface, the surface may be unevenly spaced from a generally planar measurement window of the XRF spectrometer.

Some such methods can include measuring elemental composition of the metal or alloy coating or substrate using the XRF spectrometer and obtaining the average thickness of the metal or alloy coating. This may be implemented by using a calibration relationship between metal or alloy coating thickness and an elemental composition of the metal or alloy coating or substrate.

Each measurement can be a measurement of average thickness of a metal or alloy coating. The size of the measurement window of an XRF spectrometer may be about 0.5 cm$^2$, 1 cm$^2$, 2 cm$^2$, or more. Each measurement can give the average thickness of the coating over the area of captured by the measurement window. If multiple measurements are taken at different locations on the coating, the results may be further averaged.

Example methods can be used to accurately measure average thickness of some or potentially any metal or alloy coating on a metal or alloy substrate, even when the coating has a substantially uneven surface with different distances from a measurement window of the XRF spectrometer. This may include, for instance, metal or alloy coating thickness on coated wires stranded together on regular cables or braided cables for use in any industry. Some methods therefore allow for direct measurements of intact armored cables or wire bundles in a non-destructive fashion, and can give an accurate coating thickness over an area as small as, for example, 0.25 cm$^2$, 0.5 cm$^2$, 1 cm$^2$, or even less. In other cases, the area may be larger.

Example methods may be used to quantify changes in average thickness of a metal or alloy coating by performing XRF measurements both before and after an event (or series of events). The metal or alloy coating may include zinc, for example, and the metal or alloy substrate may include an element such as iron. The coating thickness may be obtained using the concentration of zinc, iron, or both as measured using an XRF spectrometer. Some methods described herein may be used for analyzing some or any metal/alloy coatings on a metal/alloy substrate and the element(s) associated with the metal/alloy substrate can be detected at increasingly higher concentrations as the metal coating is compromised. Meanwhile, XRF-detectable elements in the metal/alloy coating can be detected at increasingly lower concentrations as the coating corrodes.

In a more specific example, a method is described for measuring average thickness of a metal or alloy coating of a plurality of outer armor wires wrapped around a cable using an XRF spectrometer. In the method, the elemental composition of the metal or alloy coating is measured using the XRF spectrometer, and an average thickness of the metal or alloy coating is determined using a calibration relationship between metal or alloy coating thickness and elemental composition of the metal or alloy coating.

Each measurement can be a measurement of average thickness of a metal or alloy coating, and the size of the measurement window of an XRF spectrometer may have a diameter of about 1 cm$^2$, although it may be larger or smaller in other examples. A whole intact cable such as a wireline cable for a wellbore application may have a diameter of 1.5 cm, and each individual outer armor wires can have a diameter of between 1 mm and 2 mm, for example. For instance, outer armor wires can have a diameter between 1 mm and 1.25 mm, or of about 1.15 mm. Thus, a 1 cm$^2$ measurement window may capture a number of individual wires (e.g., 4 to 10 wires, 6 to 8 wires, etc.). Each measurement may therefore gives the average thickness of the number of wires captured in the measurement window. If multiple measurements are taken at different locations along the cable, the results may be further averaged.

Some methods of the present disclosure may be used to measure average thickness of a metal or alloy coating of outer armor wires wrapped around a cable. In a particular example, the armor wire coating includes zinc and the armor wire substrate include irons, although other elements may be used with an XRF pspectrometer, provided the armor wire coating or armor wire substrate includes a XRF detectable element.

A particular application of methods of the present disclosure is to measure armor wire coating thickness on wireline cables used in the oil and gas industry. Example wireline cables include outer armor wires wrapped around a cable composed of a number of galvanized steel wires stranded together, and the outer armor wires include a zinc-containing coating on an iron containing substrate. The zinc content of an example galvanized coating is above 99 wt % (e.g., around 99.5-99.8 wt %).

In accordance with some embodiments of the present disclosure the cable or test samples are recovered or otherwise moved to a position that can be analyzed by an XRF spectrometer. Thus, for oil field applications, the XRF measurements could be performed on surface at the wellsite or, alternatively, could be made during cable servicing, in a laboratory, or potentially even downhole provided a downhole XRF spectrometer is available.

The XRF analysis is non-destructive as the thickness of the metal or alloy coating on the outer armor wires may be measured by XRF analysis on an intact cable. Such measurements can eliminate the destructive and time-consuming removal and analysis of individual outer wires that may be used when measuring flat coating surfaces.

Illustrative methods of the present disclosure can be used to monitor changes in average thickness of an armor wire coating such as a zinc coating on a wireline cable. As a wireline cable is used in downhole operations, the zinc coating is reduced by the corrosive downhole environment. XRF spectrometry is employed and, by calibration, quantifies coating thickness and changes in coating thickness via measured changes in the elemental composition of the coating before and after the downhole exposure. The method thus provides a non-destructive evaluation of changes in the thickness of the coating on the outer armor wires of a wireline cable, as the cable is successively exposed to corrosive downhole conditions (e.g., during a sequence of logging jobs).

The same or additional methods may be used to measure metal or alloy coating thickness on the outer armor wires of a cable as a function of the entire or part of the entire length of the cable. In particular, this method may be repeated at different locations along the cable to obtain average thickness of the metal or alloy coating at the different locations along the cable. If the measurements are compared with a predetermined threshold, a decision may be made as to whether the cable should be serviced, at which location along the cable servicing should occur, or when the cable should be serviced. The decision can be made manually or automatically.

Where embodiments are used to evaluate a wireline cable with zinc-coated armor wires, the average thickness of the zinc coating can be measured after some or even after each well descent, or when the cable is being serviced between jobs. Each quantification is non-destructive and delivers an estimate of the average zinc coating thickness along the cable from the downhole end. This information may then be used to advise on decisions as to when and where the cable length should be cut due to excessive zinc/coating loss, or when and where the outer armor wires should to be replaced.

Embodiments of the present disclosure provide methods for analyzing a corrosive environment using an XRF spectrometer. An illustrative method includes placing a test sample in a corrosive environment for a predetermined length of time. The test sample can include a metal or alloy coating and a metal or alloy substrate, and the test sample can be removed from the corrosive environment. The elemental composition of the metal or alloy coating can be measured using the XRF spectrometer, and an average thickness of the metal or alloy coating can be obtained using a calibration relationship between metal or alloy coating thickness and elemental composition of the metal or alloy coating.

To analyze a corrosive environment, XRF measurements may be taken before and after exposure to the environment. Results for different test samples may then be compared to choose the optimal metal or alloy coating type or structure or the optimal metal or alloy substrate type or structure. In the same or other embodiments, the same test sample can be tested in different corrosive environments. XRF measurements may be taken before and after exposure to the environments. Results for different environments may then be compared to choose the optimal environment for the materials and structure represented by the test sample. Samples may be various metal/alloy coated or bulk metal/alloy coupons, discrete wires of varying composition, or intact armored cable samples.

For instance, a test sample may be a downhole cable (e.g., wireline or electric submersible pump (ESP) cable) including a plurality of outer armor wires wrapped around a cable. The corrosive environment may be a corrosive downhole environment that includes a solid or liquid suspension such as a drilling fluid, a reservoir drill-in fluid, a completion fluid, or a solids-laden multi-phase production fluid.

As such, a method may be used to diagnose and even quantify the corrosivity of a given downhole environment as a function of metal or alloy type or structure. A cable may be used to convey multiple isolated test samples to the downhole environment. In a downhole environment, wellsite XRF measurements may be taken before and after exposure in order to evaluate corrosion under realistic field conditions. The result may be a field evaluation of the downhole corrosive environment for the efficiency of candidate protective coatings, substrates, and cable cores, or be used to provide information to be used in material selection for cables, completions, artificial lift, production, or downhole equipment design.

As discussed herein, some embodiments of the present disclosure provide an apparatus for measuring average thickness of a metal or alloy coating of a plurality of outer armor wires wrapped around a cable using a XRF technology. An example apparatus can include an XRF spectrometer having a measurement window, as well as a mechanism to move the cable past the measurement window of the XRF spectrometer. This can be accomplished at a stationary XRF spectrometer and by passing the cable past the measurement window at a substantially constant speed. The XRF measurement can be taken at regular intervals by the XRF spectrometer as the cable moves past the measurement window.

The elemental composition of the metal or alloy coating may be measured along a full or partial length of the cable as the cable is being moved past the XRF measurement window. The rate at which the cable is moved past the XRF measurement window may be optimized with respect to the count rate of the radiation fluorescing from each analyte element. In some cases, the XRF spectrometer measures a substantial length of the cable. In the same or other embodiments, the cable may be stationary and the XRF spectrometer may move relative to the cable. In the oil and gas industry, analysis of the cable may occur during uncoiling or coiling of the cable at the wellsite, or during cable servicing operations. As such, a measurement apparatus may be used to conduct a full or partial cable analysis of coating (e.g., zinc) loss starting from downhole or uphole end of a used wireline cable. The analysis is non-destructive as it does not remove discrete armor wires from the surface of the cable, or expose a cross-section of the coating.

Monitoring of the thickness of zinc or other coatings on the outer armor wires of cables used in a downhole environment can be used to inform operations regarding the need for and timing of cable servicing, including deployment of a protective film, removal of downhole sections of cable that show coating loss to be above a certain critical threshold, replacement or renewal of the outer armor wires, or cable retirement.

For any of the embodiments of the present disclosure, various calibration relationships between metal or alloy coating thickness and elemental composition of the metal or alloy coating or the metal or alloy substrate may be used. Example calibration relationships include a relationship between metal or alloy coating thickness and the concentration of an element in the metal or alloy coating (Calibration Relationship 1 or CR1). In another example, the relationship is between metal or alloy coating thickness and the ratio between the concentration of an element in the metal or alloy coating and the concentration of an element in the metal or alloy substrate (Calibration Relationship 2 or CR2).

CR1 may be used, for example, when the metal or alloy coating is new, has been cleaned, or is otherwise free of deposits. CR2 may be used, for example, whether the metal or alloy coating is clean or not, because it provides accurate average coating thickness even in the presence of mud solids or other deposits on the coating.

The presence of solid deposits on metal or alloy coatings can reduce XRF-determined concentrations of composite elements in the metal or alloy coating, which in turn can reduce the XRF measurements of coating thickness. In view of this effect, cleaning is normally used to obtain accurate thickness of the metal/alloy coating if CR1 is to be used. In particular, prior to XRF analysis of the elemental composition of a metal or alloy coating, solids and other deposits which have invaded the surface may be removed to ensure accuracy of coating thickness derived from XRF measurements.

In addition, the composition of the recovered solids may be separately analyzed to provide further information regarding the environment the coating has been exposed to. Chemical analysis methods may be used including XRF spectrometry, Fourier Transform Infra-red (FTIR) Spectroscopy, or X-ray photoelectron spectrometry (XPS).

CR2, which uses a ratio (wt % element in coating/wt % element in substrate) to determine coating thickness may be used where cleaning is not possible, practical, or desirable, and it allows accurate measurements of intact cables in the presence of mud solids or other deposits. For instance, when the elemental composition of a metal or alloy coating includes ≥2 wt % elements present in solids which have invaded the surface, elemental composition measurements by XRF may be interpreted in terms of coating thickness using CR2 based on the ratio of the concentration of a major element in the metal coating divided by the concentration of a major element in the underlying substrate to obtain accurate average coating thickness.

For example, wireline cables discussed herein can include outer zinc-coated armor wires with an iron-containing substrate wrapped around a cable. Therefore, a calibration relationship between coating thickness and the ratio wt % Zn/wt % Fe may be used to accurately assess average coating thickness via intact cable analysis in the presence of residual mud solids using an XRF spectrometer.

Aspects of the present disclosure provide methods for diagnosing the extent of cable cleaning, or for analyzing the effectiveness of a cable cleaning service. The presence of solid deposits such as mud solids on the metal or alloy coating can reduce XRF-determined concentrations of composite elements in the metal or alloy coating, which can in turn reduce the XRF measurements of metal/alloy coating thickness when CR1 is used. The more solid deposits there are on the coating, the more the XRF-determined concentrations and coating thickness may be reduced. Therefore, the extent of either reduction may be used to determine the extent of cable cleaning. For example, wt % Zn measurements using new wireline cables and used wireline cables can be compared to determine the extent of cleaning of the used cables. Similarly, (wt % Zn+wt % Fe) measurements may be used.

A convenient diagnostic of sufficient cleaning is when XRF-determined concentrations of composite elements in the metal or alloy coating or in the metal or alloy substrate reach or exceed a predetermined threshold. For example, for wireline cables, a convenient diagnostic of sufficient cleaning can be when (wt % Zn+wt % Fe) is ≥98 wt %, although other thresholds may be used (e.g., ≥80 wt %, ≥90 wt %, ≥95 wt %, ≥97 wt %, ≥99 wt %, ≥99.5 wt %).

Referring now to FIG. 1-1, a cable is shown and includes a plurality of outer armor wires 20 wrapped around an inner cable 10. The metal or alloy coating of the outer armor wires 20 is an example of a metal or alloy coating with an uneven surface as seen from an XRF measurement window.

Figures 1, 2:
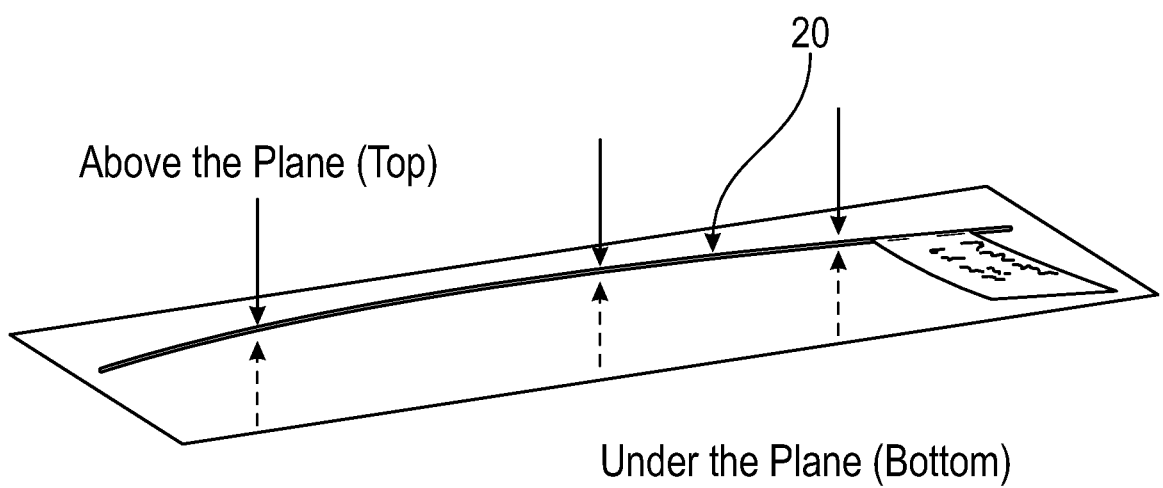
Figure 2:
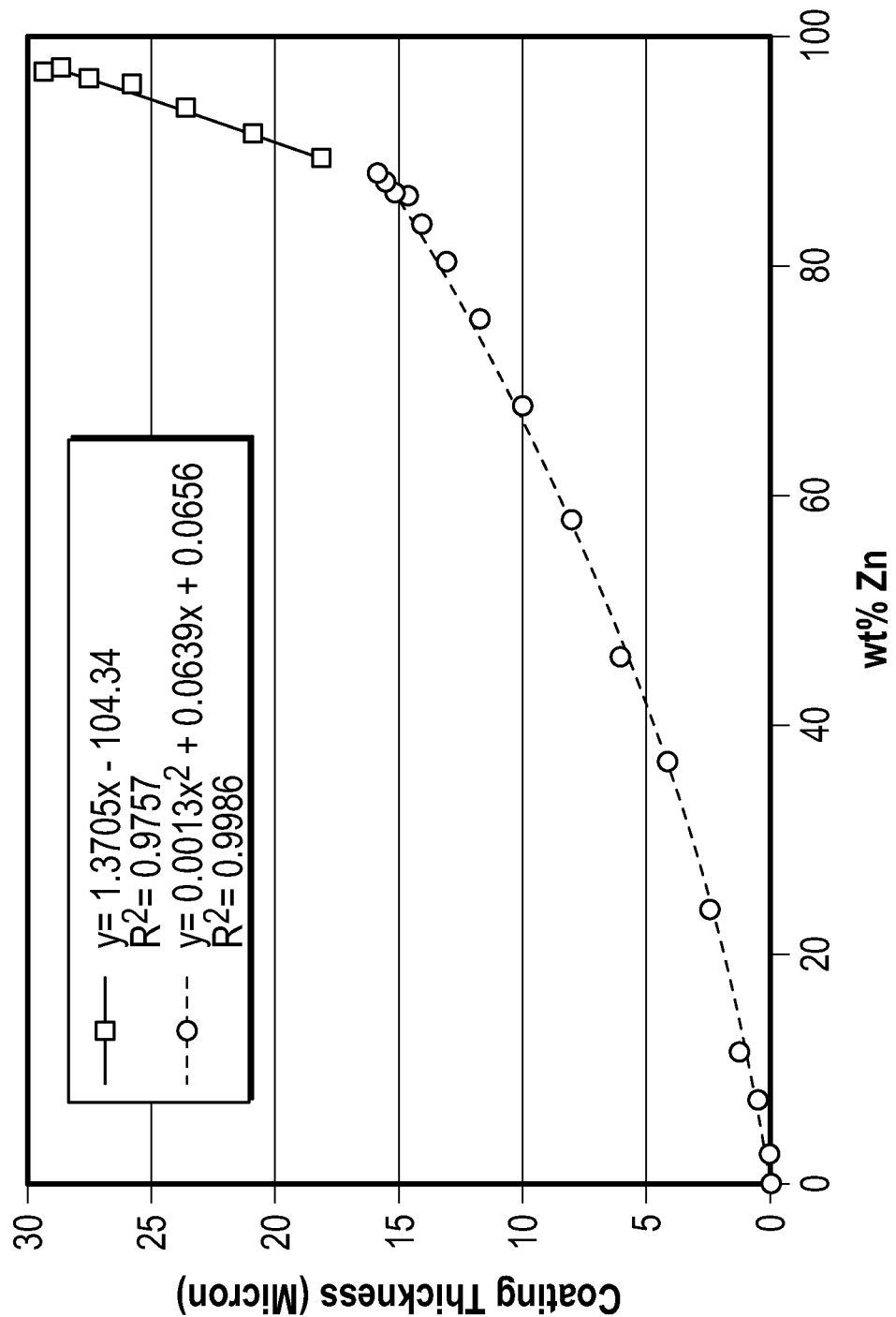

FIG. 1-2 shows an individual outer armor wire 20 of a plurality of outer armor wires wrapped around a cable 10 shown in FIG. 1-1. Individual outer armor wires 20 could be removed from the cable 10 before XRF analysis is performed to measure the thickness of the metal or alloy coating of the outer armor wires 20. Direction of XRF analysis is indicated in FIG. 1-2.

Removal of the wire 20 is not used in some embodiments of the present disclosure, as methods of the present disclosure allow for XRF analysis without calling for taking off individual armor wires from the cable or destructive cutting of the whole intact cable in order to quantify average coating thickness of the armor wires wrapped around a cable. Rather, the inventors have discovered a non-destructive method for measuring average metal or alloy coating thickness of armor wires directly on an intact armored cable using an XRF spectrometer.

The XRF measurement may be taken directly on the coated surface of armor wires stranded together forming an outer armor layer of a cable. Depending on the calibration relationship used, the measurement of metal or alloy coating thickness can tolerate the presence of surface solids where their composition is typical of the intended application.

Some experiments were performed to validate the methods and devices of the present disclosure and are described in greater detail hereafter.

Experiment 1

Calibration Relationship 1—Calibration of XRF Measurements of Zn Coating Thickness on Galvanized Carbon Steel Wires and Sheets In multiple experiments, several galvanized carbon steel wire samples with a range of initial Zn coating thicknesses and several galvanized carbon steel flat sheet samples with a range of Zn coating thicknesses were analyzed using an XRF spectrometer. This analysis occurred both before treatment and after treatment with 1-2 mol/L HCl at ambient temperature for a range of different exposure times. For each sample, and after each specific exposure: (1) the weight loss was measured and an average Zn coating thickness was calculated given the known density of zinc; and (2) XRF analysis of the elemental composition of the surface of the exposed sample was carried out. The XRF analysis pertains to an area of the sample which is equivalent to the measurement window, which in this experiment was a circular window with a diameter of 1 cm. In an experimental set-up as used for the calibration, the XRF data is collected during a 30 second count period and the resultant energy spectrum is interpreted via an interpretation algorithm providing quantitative analysis of 29 elements, namely: Ba, Sb, Sn, Cd, Pd, Ag, Ru, Mo, Nb, Zr, Bi, Pb, Se, Au, W, Zn, Cu, Ni, Co, Fe, Mn, Cr, V, Ti, Al, S, P, Si, and Mg. As can be appreciated by the skilled person in the art, the duration of the counting period can be varied as can the details of the spectrum interpretation algorithm.

FIG. 2 shows the calibration relationship between average Zn coating thickness as specified by a supplier's galvanization treatments for non-treated samples and as determined by weight loss measurements for acid-treated samples and average wt % Zn as determined by XRF analysis on multiple areas on each of the non-treated and acid-treated samples. This is an example of Calibration Relationship 1 (CR1) as discussed herein.

A systematic increase in XRF-determined wt % Zn with increasing Zn coating thickness for the wire and flat sheet samples is observed. When the zinc coating thickness exceeds the maximum depth of penetration of the XRF analysis, the elemental composition of the carbon steel substrate is no longer detected such that the XRF-determined wt % Zn tends toward 100 wt %. For example, some currently available XRF technologies may not determine zinc coating thickness when the coating thickness exceeds the range 35-40 microns. However, galvanized coatings on the outer (and inner) armor wires of cables can have an initial average thickness in the range 10-25 microns such that even such XRF technology can be usefully applied to monitor changes in zinc coating thickness without any depth limitation.

Experiment 2
Measurement of Zn Coating Thickness on Individual Cleaned Armor Wires Samples of a new wireline logging cable 10 having a diameter of about 1.5 cm were tested, along with a range of samples from the same cable 10 after its use in a variety of downhole environments. The Zn content of a galvanized coating on a wireline cable can be around 99.5-99.8 wt %. In this experiment, the outer armor wires 20 of the cable 10 were removed and cleaned to remove any solid deposits prior to multiple analysis by an XRF spectrometer. Measurements were made on both sides of each wire sample 20 as shown in FIG. 1-2, one side being that which was outwardly facing while attached to the cable 10 and the other side being that which was inwardly facing while attached to the cable 10.

Figure 3:
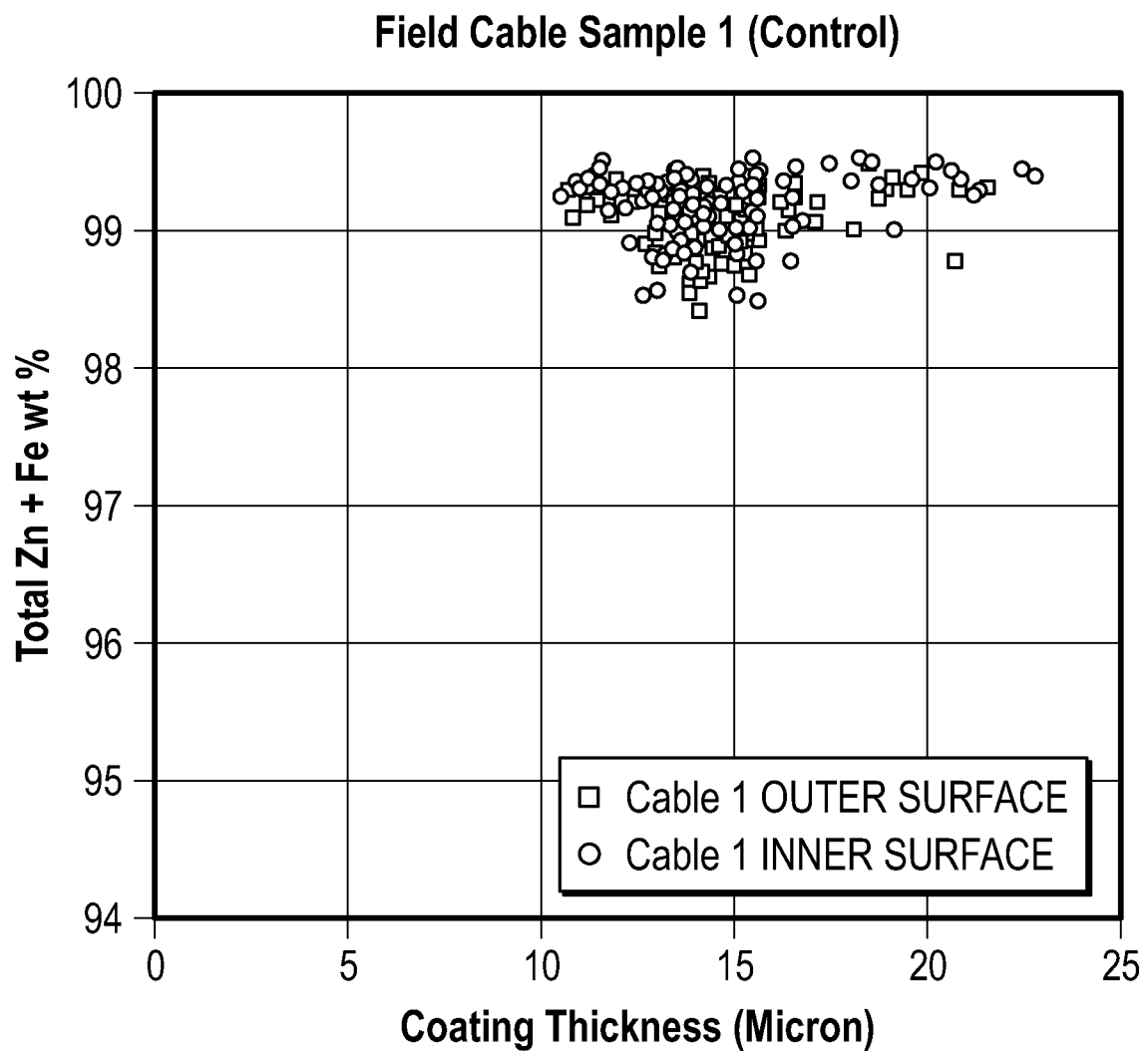
FIG. 3 is a graph showing XRF analysis results of unused armor wires.

FIG. 3 shows XRF analysis of multiple individual wires 20 taken from the new unused cable 10. A range of Zn coating thicknesses between 10.5 and 23 microns were observed, with no significant difference between the outer (above plan) and inner (under the plane) sides of the wires.

The cable 10 was then used for logging operations during which it was exposed to a drilling fluid and temperatures up to 109° C. for 48 hours (total time-in-hole). Individual wires 20 were subsequently cleaned and measured by an XRF spectrometer, and FIG. 4 shows measurement results for new cable samples (cable 1) and used cable samples (cable 2).

Figure 4:
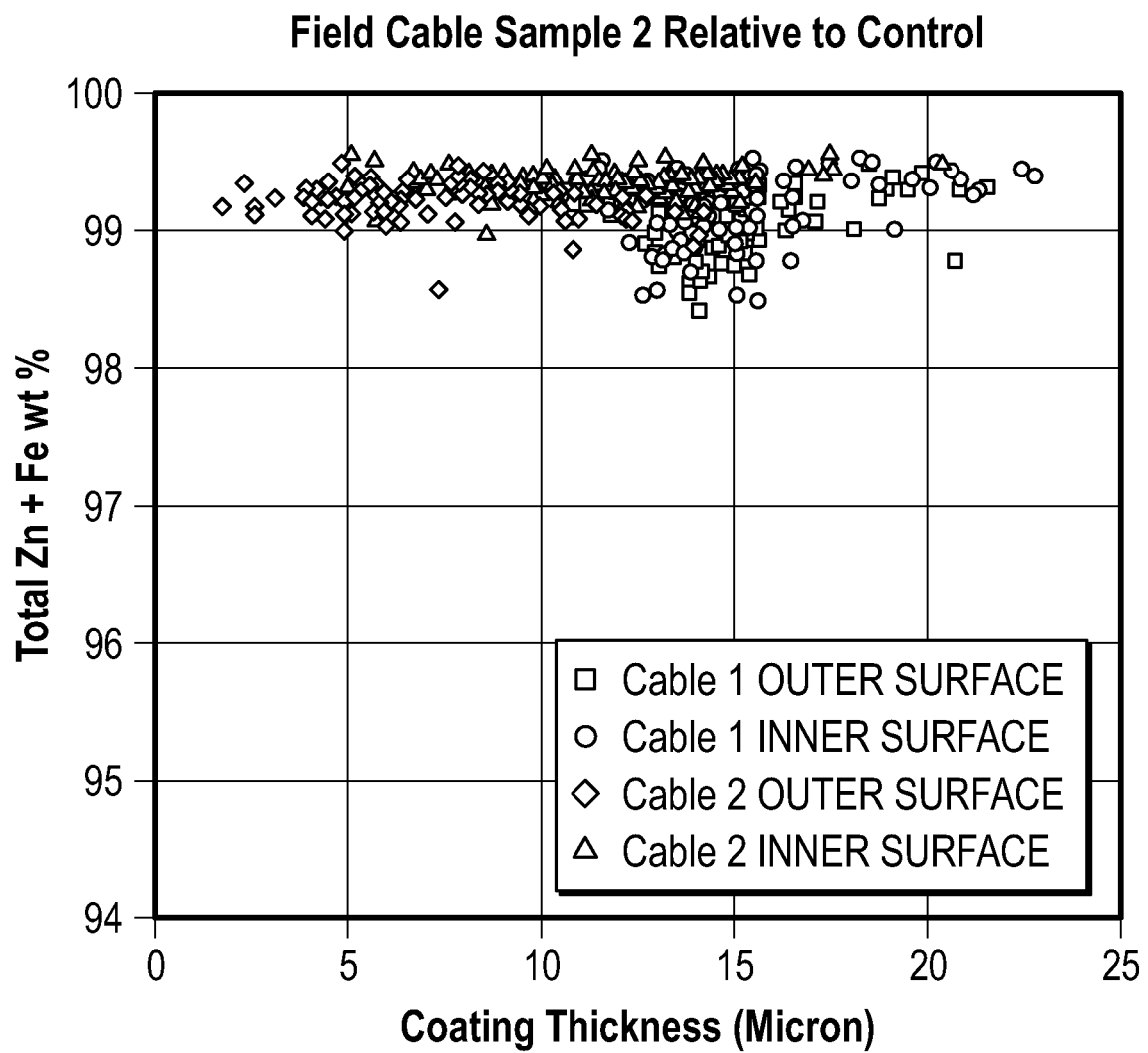
FIG. 4 is a graph showing XRF analysis results of used and cleaned armor wires.

As can be seen in FIG. 4, Zn coating thickness on used cable samples (cable 2) had been reduced to the range 1.8 to 20.5 microns and a greater Zn loss (i.e. higher corrosion rate) was observed on the outwardly facing sides of the wires as compared to the inwardly facing sides. The average Zn loss rate on the outwardly facing side of the wire was 3.33 μm/day, while on the inwardly facing side of the wire it was 1.3 μm/day.

Experiment 3
Measurement of Zn Coating Thickness on Outer Armor Wires Situated on Cleaned Intact Cables ("Intact Cable" Analysis)

Figure 5:
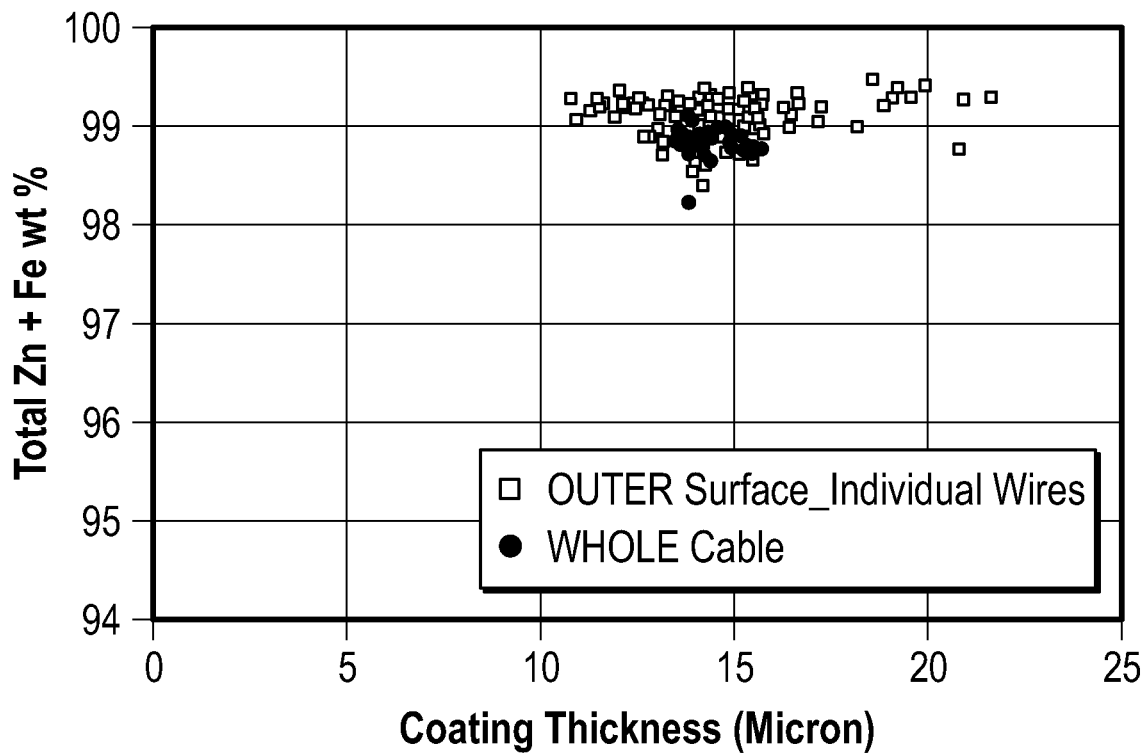
FIG. 5 is a graph showing XRF analysis results of new armor wires and new intact cables.
Figure 6:
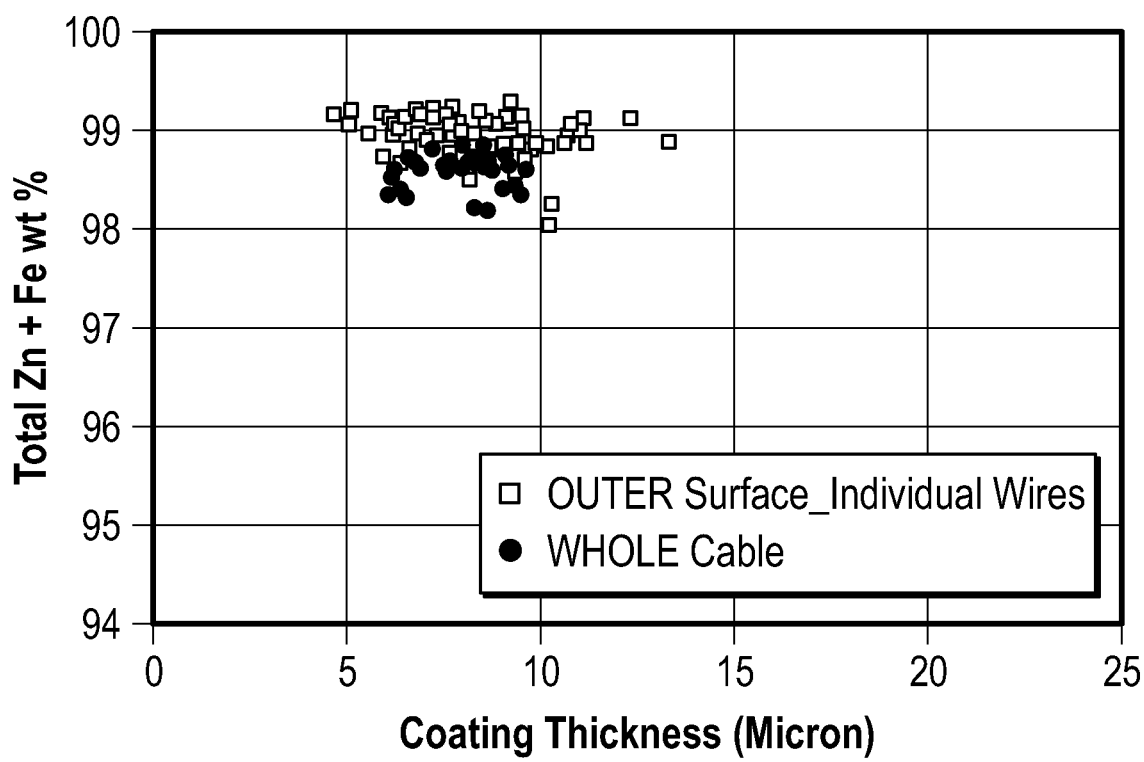
FIG. 6 is a graph showing XRF analysis results of used and cleaned armor wires and intact cables.

FIGS. 5 and 6 show Zn coating thicknesses measured on the outer surface of individual, removed outer armor wires 20 and on the whole intact cable 10, both for the new cable 10 (the control sample of FIG. 5) and for a sample of the same cable 10 after multiple logging operations (the used sample of FIG. 6). In this experiment, the used cable had been exposed to drilling fluids during four downhole logging jobs with successive times-in-hole and temperature conditions as follows: 48 hours at 109° C., 124.5 hours at 80° C., 80.5 hours at 114° C., and 46 hours at 115° C.+13 hours at 65° C.

All the results shown in FIGS. 5 and 6 pertain to thoroughly cleaned individual wires 20 or cleaned intact cable 10 with mud solids removed from the surfaces of the samples.

As shown in FIG. 5, for the new cable Zn coating thicknesses determined by XRF analysis of the outer side of individual (removed) outer armor wires and by XRF analysis of the intact cable surface are in reasonable agreement, at least in terms of the average values. These values—corresponding to FIG. 5—are reflected below in Table 1:

TABLE 1

| Sample analyzed by XRF | Mean thickness Zn coating (micron) | Standard deviation (micron) | RSD % |
|---|---|---|---|
| Outer surface of individual outer armor wires (cleaned) | 14.63 | 2.03 | 13.9 |
| Inner surface of individual outer armor wires (cleaned) | 14.61 | 2.34 | 16.0 |
| Intact cable surface (cleaned) | 14.34 | 0.63 | 4.4 |

As shown in the above Table 1 and from FIG. 5, the range of Zn coating thicknesses for the individual wires is significantly greater than the range results given by analysis of the intact cable. However, the mean values are in good agreement. This proves that analysis of the whole intact cable produces accurate average metal/alloy coating thickness, perhaps by introducing additional averaging due to concomitant analysis of adjacent bundled wires.

After the same cable had been repeatedly exposed to downhole conditions, a significant decrease in Zn coating thicknesses was observed as shown in FIG. 6. A comparison of measurements taken on individual wires and the intact cable is given below in Table 2:

TABLE 2

| Sample analyzed by XRF | Mean thickness Zn coating (micron) | Standard deviation (micron) | RSD % |
|---|---|---|---|
| Outer surface of individual outer armor wires (cleaned) | 8.34 | 1.64 | 19.7 |
| Inner surface of individual outer armor wires (cleaned) | 13.91 | 2.25 | 16.2 |
| Intact cable surface (cleaned) | 7.90 | 1.10 | 13.9 |

Again, all the results shown above in Table 2 and in FIG. 6 pertain to thoroughly cleaned individual wires or cleaned intact cable with mud solids removed from the surfaces of the samples. Again, good agreement was observed between the results for the outer surface of the individual outer armor wires and the intact cable surface. It is also clear that zinc is more readily removed from the outer surface of the outer armor wires as compared to the inner surface which is efficiently protected from the corrosive downhole environment.

Experiment 4
Measurement of Zn Coating Thickness on Outer Armor Wires Situated on Intact Cables in the Presence of Residual Mud Solids Following downhole exposure of the cable to drilling fluids, solid deposits are clearly evident on the intact cable surface, and particularly in crevices between adjacent outer armor wires. In Experiment 4, zinc is a major element in the coating of the armor wires and iron is a major element in the substrate of the armor wires. When the intact cable is XRF-analyzed without prior removal of these solids, a significant decrease in the XRF-determined concentrations of the main elements of interest is observed (e.g., a decrease in both wt % Zn and wt % Fe). In view of this effect, a method to accurately assess the thickness of the Zn coating via intact cable analysis in the presence of residual mud solids has been developed by making use of the ratio wt % Zn/wt % Fe.

Figure 7:
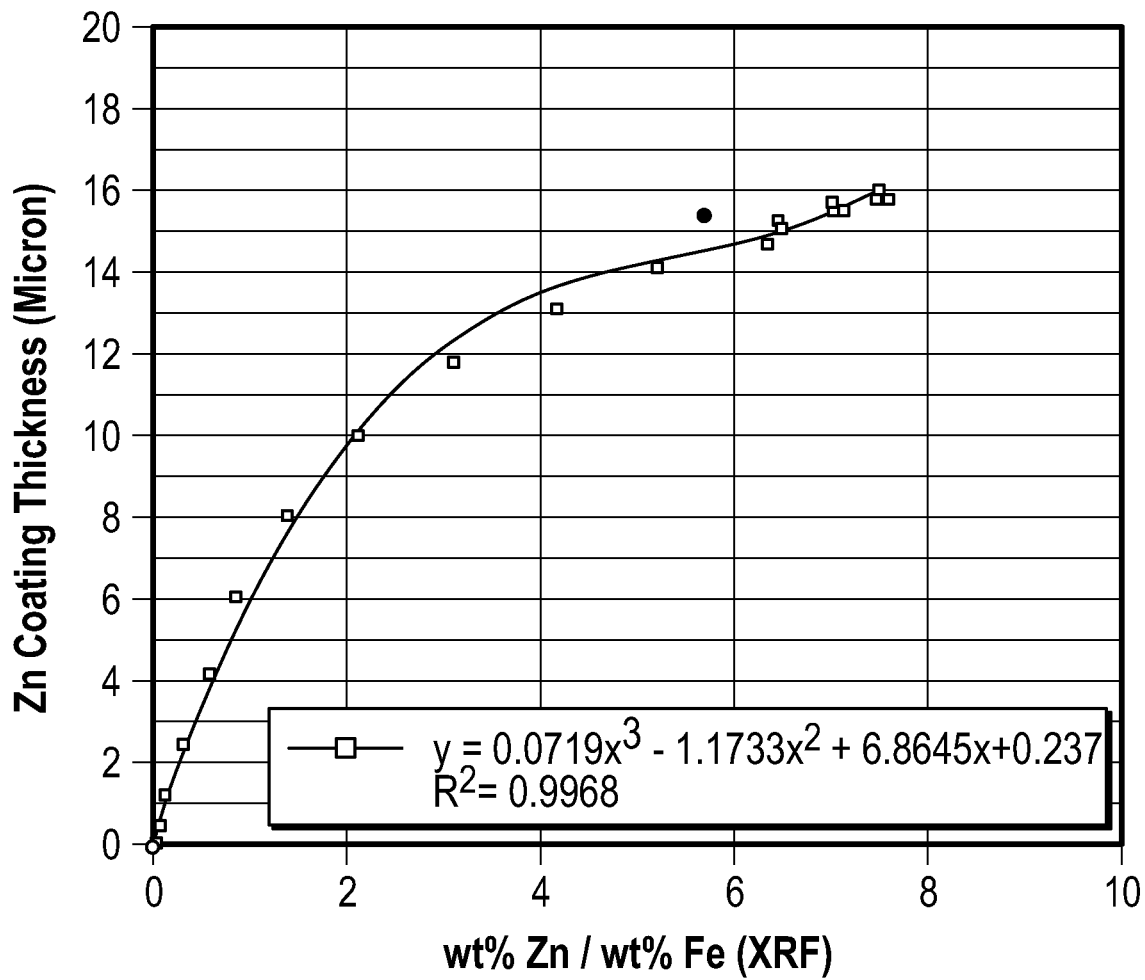
FIG. 7 is a graph showing another example of a calibration relationship between coating thickness and elemental composition.

Firstly, an example of Calibration Relationship 2 as discussed herein is constructed as shown in FIG. 7. This relates the ratio wt % Zn/wt % Fe to Zn coating thickness for the same calibration samples used to construct the calibration relationship shown in FIG. 2.

Figure 8:
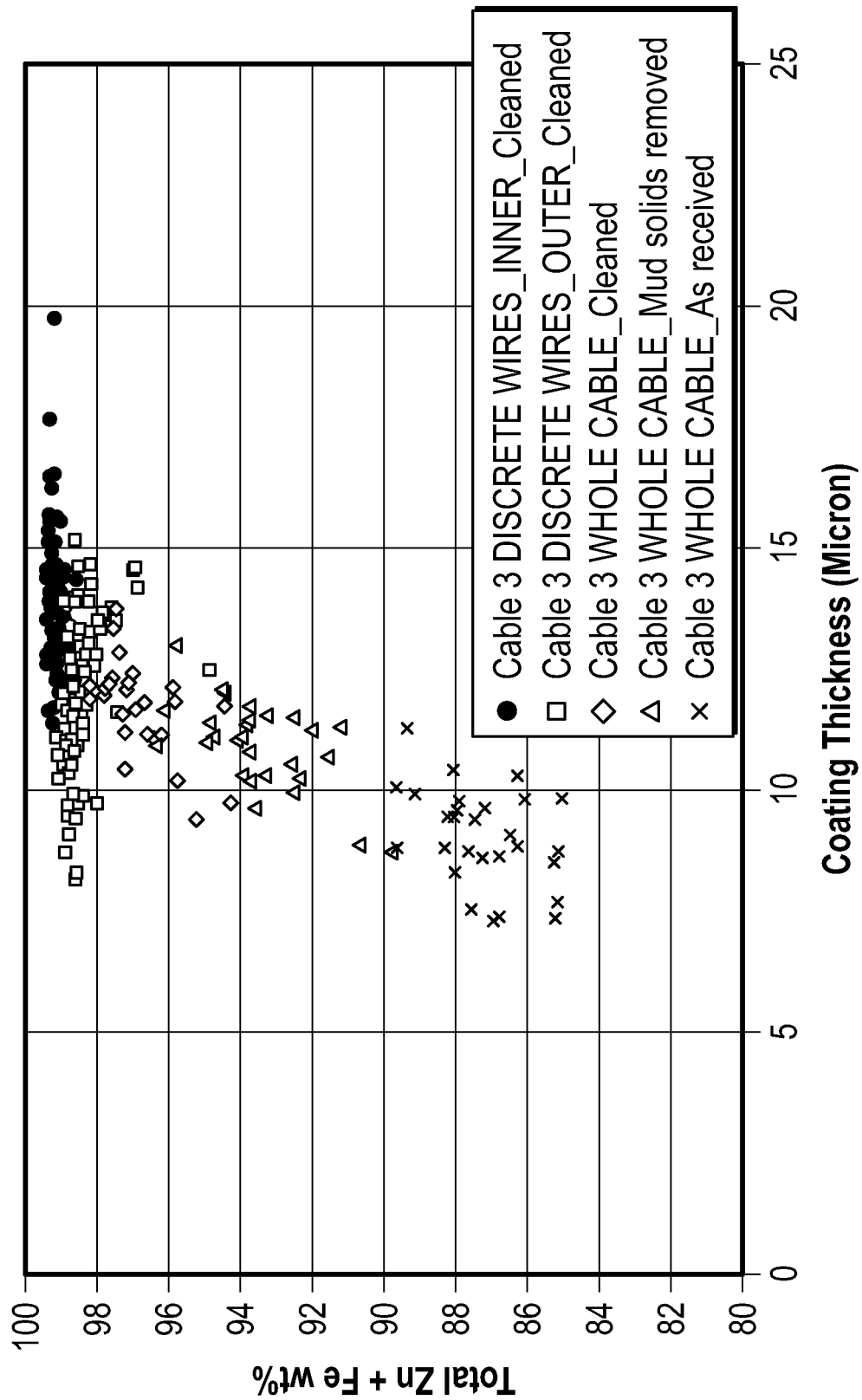
FIG. 8 is a graph showing XRF analysis results for cleaned armor wires and intact cables cleaned to different extents, using the calibration relationship of FIG. 2.

"Field cable 3" had been exposed to drilling fluid at a bottomhole temperature of 80° C. for 124.5 hours (total time-in-hole). Significant quantities of mud solid deposits were evident on the "as received" field cable 3 surface. FIG. 8 compares relationships between the total wt % (Zn+Fe) and Zn coating thickness as determined using the calibration relationship in FIG. 2 for a series of analysis of "field cable 3".

Figure 9:
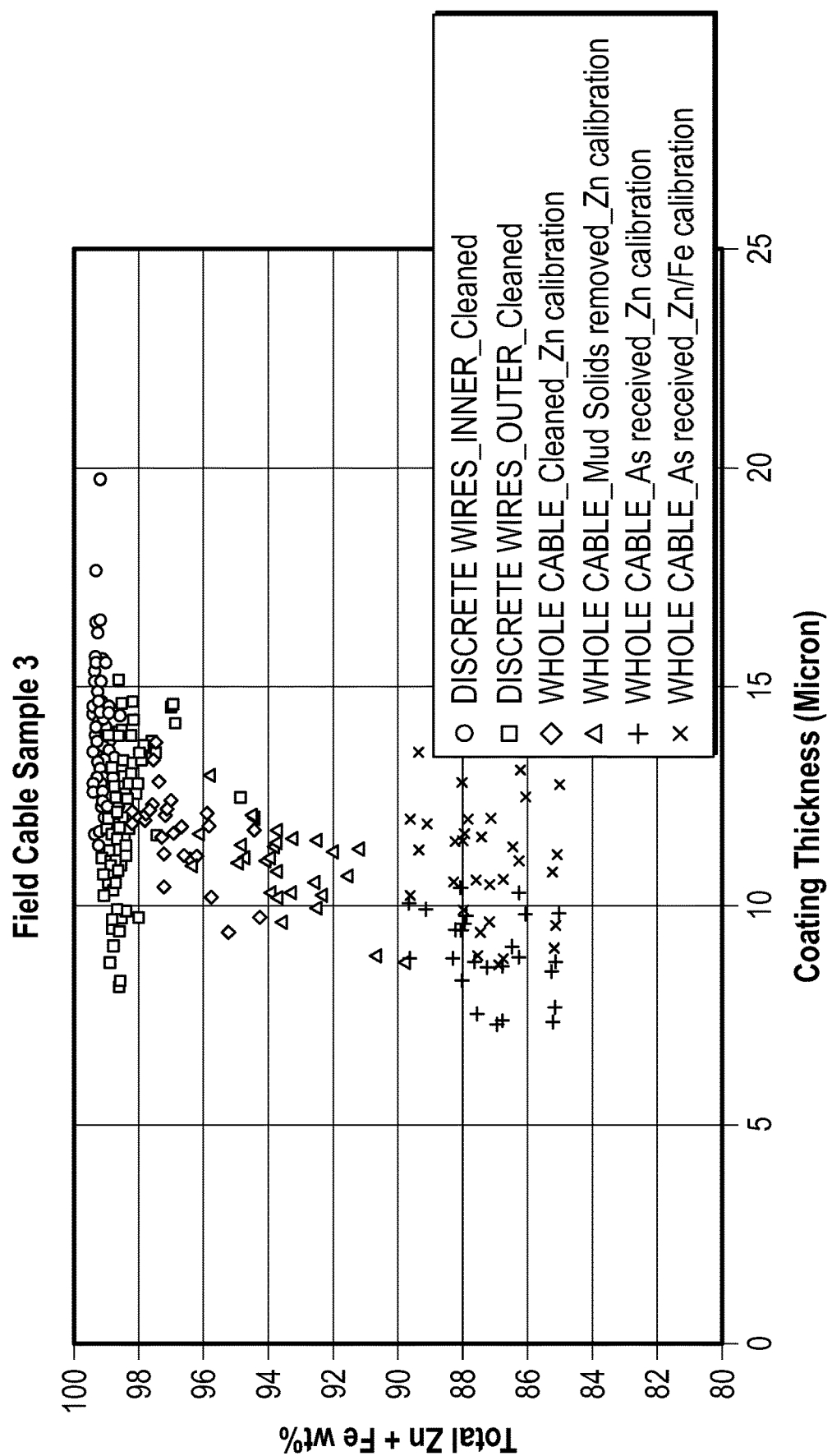
FIG. 9 is a graph showing XRF analysis results for cleaned armor wires and intact cables cleaned to different extents, using the calibration relationship of FIG. 7.

Sub-experiment 4.1: Individual outer armor wires were removed from a section of field cable 3 and their outer and inner sides were XRF-analyzed after thorough cleaning in which mud solids were removed. The results are shown in FIG. 9. This data indicates (wt % Zn+wt % Fe)≥98 wt % and significant Zn loss, mainly from the outer side of the wires, as compared with the control data for the new unused cable (FIG. 3).

Sub-experiment 4.2: XRF-analysis of the 'as received' intact cable with no removal of mud solids or any form of cleaning. The results are also shown in FIG. 9. The presence of the mud solids reduces the range of (wt % Zn+wt % Fe) to 85 to 90 wt % and the Zn coating thicknesses given by the calibration shown in FIG. 2 are biased to lower values as compared to the results obtained for the individual wires in sub-experiment 4.1.

Sub-experiment 4.3: XRF-analysis of the intact cable after removal of the mud solids are shown in FIG. 9. As expected, the (wt % Zn+wt % Fe) has increased to the range 91 to 96 wt % and the Zn coating thicknesses given by the calibration shown in FIG. 2 show less bias with respect to the results for the individual wires.

Sub-experiment 4.4: XRF-analysis of the intact cable after removal of the mud solids and after additional cleaning are shown in FIG. 9. As expected, the (wt % Zn+wt % Fe) has further increased to the range 94 to 99 wt % and the Zn coating thicknesses given by the calibration shown in FIG. 2 are now in good agreement with the results for the individual wires which have been cleaned.

The above results of the four sub-experiments clearly demonstrate the effects of mud solids and cleaning on the accuracy of evaluating Zn coating thickness from intact cable analysis using Calibration Relationship 1 as represented by FIG. 2.

This can be used to diagnose the extent of cleaning of an intact cable. For example, a convenient diagnostic of sufficient cleaning is when (wt % Zn+wt % Fe) measurement by XRF is ≥98 wt %, although other diagnostic values may be used as discussed herein. (1) In order to obtain an accurate evaluation of the thickness of the Zn coating from XRF analysis of an intact cable with solid deposits thereon, it has been determined that it is likely necessary to (1) sufficiently clean the cable surface prior to XRF measurements or (2) use a less biased calibration relationship (e.g., Calibration Relationship 2 relating Zn coating thickness to the ratio wt % Zn/wt % Fe). One such example is shown in FIG. 7.

When Calibration Relationship 2 correlating Zn coating thickness to the ratio wt % Zn/wt % Fe as shown in FIG. 7 is applied to the analysis of the 'as received' intact cable with no removal of mud solids or any other forms of cleaning, the coating thickness results shown in FIG. 9 are in good agreement with the cleaned individual wires and the cleaned intact cable analysis also shown in FIG. 9.

Experiment 5
Measurement of Zn Coating Thickness on a Further 'as Received' Field Cable Sample Intact Cable Analysis—as Received and After Cleaning A further cable sample from an oil field after exposure to drilling fluid under downhole conditions was tested. Also tested were samples of new 'unused' discrete wires from the same batch of wires used to fabricate the cable sample.

Figure 10:
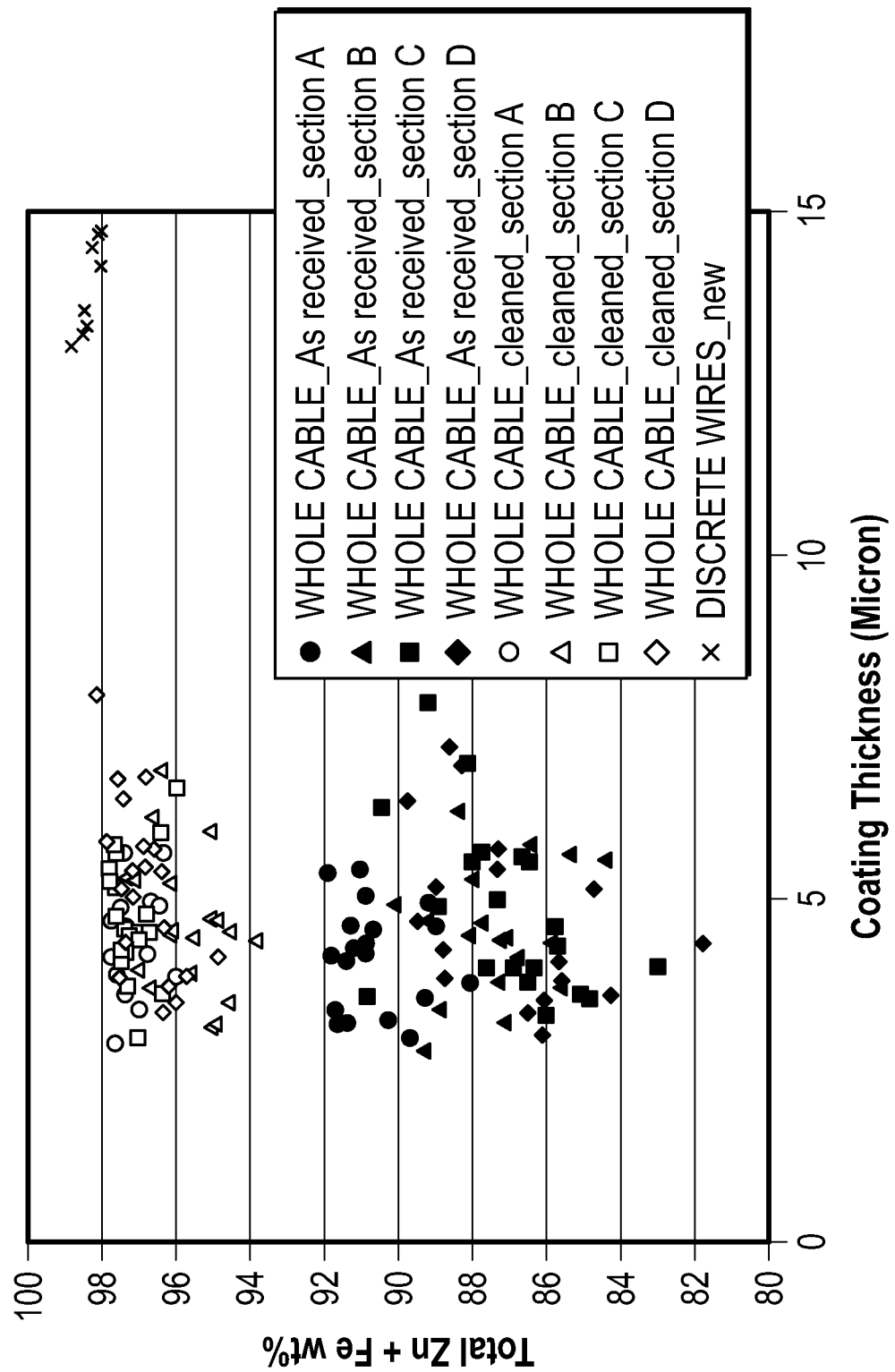
FIG. 10 is a graph showing XRF analysis results of unused armor wires, unused cables, and cleaned intact cables for a further sample, using the calibration relationship of FIG. 7.

XRF measurements were collected along both the unused discrete wires (control) and the whole intact cable after exposure to downhole conditions. The calibration correlating the ratio of wt % Zn/wt % Fe to coating thickness as shown in FIG. 7 was used and the results are shown in FIG. 10.

The unused discrete wires have an average coating thickness of 13.9 μm. On exposure to the downhole conditions, the average coating thickness was reduced to 4.7 μm. Analysis of both the 'as received' and cleaned intact cable reveals a very similar Zn loss relative to the new unused wires. As expected, an increase in wt % (Zn+Fe) was observed after cleaning the intact cable due to the removal of solid deposits. Again, the use of the Zn wt %/Fe wt % ratio calibration means that the range of coating thicknesses determined for the 'as received' and cleaned intact cable analysis are very similar.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations. Further, the various examples are presented by way of illustration; however, features and aspects of different examples may be combined except where such aspects are mutually exclusive.

While the principles of the disclosure have been described above in connection with specific apparatuses and methods, it is to be clearly understood that this description is made only by way of example and not as limitation on the scope of the invention.

Specific details are given in the description to provide an understanding of the embodiments. However, it will be understood by one of ordinary skill in the art that the described embodiments may be practiced without these specific details. Additionally, in order to unnecessarily complicate the disclosure, aspects of well-known circuits, processes, processes, structures, and techniques are described without unnecessary detail in order to avoid obscuring the embodiments, as such aspects are understood by those of skill in the art. For instance, some XRF spectrum interpretation algorithms, processes, and equipment are not defined in exhaustive detail as they are already understood by the person of ordinary skill in the art.

Further, embodiments may be implemented by hardware, software, firmware, middleware, microcode, hardware description languages, other mechanisms, or any combination thereof. When implemented in software, firmware, middleware or microcode, the program code or code segments to perform the necessary tasks may be stored in a machine-readable medium such as storage medium, or transmitted in a machine-readable medium such as transmission media. A processor(s) may perform the tasks within a routine or method. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, "storage media", "computer-readable storage media," and the like refer to physical media that stores software instructions in the form of computer-readable program code that allows performance of embodiments of the present disclosure. "Transmission media", "computer-readable transmission media," and the like refer to non-physical media which carry software instructions in the form of computer-readable program code that allows performance of embodiments of the present disclosure. Thus, by way of example, and not limitation, embodiments of the present disclosure can include at least two distinctly different kinds of computer-readable media, namely storage media and/or transmission media. Combinations of storage media and transmission media are included within the scope of computer-readable media.

To further illustrate the distinct nature of storage media and transmission media, storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or solid state drives, or other types of storage devices.

Transmission media may conversely include communications networks or other data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can therefore include a communication network and/or data links, carrier waves, wireless signals, and the like, which can be used to carry desired program, code means, or instructions.

Computer-readable media may therefore be within computer system in some embodiments, but may be distributed within and/or across multiple internal and/or external enclosures of a computing system, multiple computing systems, or a computing network. Computer-readable media of such type may be implemented as one or more computer-readable or machine-readable storage media, transmission media, or a combination of storage and transmission media.

Instructions may be provided on one computer-readable or machine-readable medium, or may be provided on multiple computer-readable or machine-readable media distributed in a large system having possibly plural nodes. Such computer-readable or machine-readable medium or media is (are) considered to be part of an article (or article of manufacture). An article or article of manufacture may refer to any manufactured single component or multiple components. The computer-readable medium or media may be located either in the machine running the machine-readable instructions, or located at a remote site from which machine-readable instructions may be downloaded over a network for execution. Further, where transmission media is used, upon reaching various computing system components, program code in the form of computer-executable instructions or data structures can be transferred automatically or manually from transmission media to storage media (or vice versa). For example, computer-executable instructions or data structures received over a network or data link can be buffered in memory-type storage media (e.g., RAM) within a network interface module (NIC), and then eventually transferred to computer system RAM and/or to less volatile storage media (e.g., a hard drive or optical storage) at a computer system. Thus, it should be understood that storage media can be included in computer system components that also (or even primarily) utilize transmission media.

It is to be understood that the disclosure herein provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, but may also include embodiments in which additional features may be formed or provide between the first and second features, such that the first and second features may not be in direct contact.

Embodiments of the present disclosure may be described as a process that may include various acts, or which can be depicted as a flowchart, a flow diagram, a data flow diagram, a structure diagram, or a block diagram. Although a process or flowchart may describe the operations as a sequential process, many of the operations can be performed at least partially in parallel or concurrently. In addition, the order of the operations may be re-arranged. A process may terminate or restart when its operations are completed, but could have additional steps not included in the description or figure, or some or all of the steps may be repeated through an iterative process. A process may correspond to a method, a function, a procedure, a subroutine, a subprogram, etc. When a process or act corresponds to a function, its termination can correspond to a return of the function to the calling function or a main function.

As used herein, the terms "having", "including", "comprising", and the like are intended to be open-ended, whereas the term "consisting" is closed. Thus, a method having/including/comprising three elements may include more than the three elements, whereas a method consisting of the three elements would include only the recited three elements. The term "or" as used herein is not intended to be mutually exclusive of recited options, unless the context clearly indicates otherwise. Thus, a method including A or B would include A alone, B alone, or A and B. In contrast, a method including a single one of A or B would include A lone or B alone, but not A and B.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions and alterations herein without departing from the scope of the present disclosure.

What is claimed is:

1. A method for measuring an average thickness of a metal coating or an alloy coating on a metal substrate or an alloy substrate using an X-ray fluorescence (XRF) spectrometer, wherein the metal coating or the alloy coating has an uneven surface with substantially different distances from a measurement window of the X-ray fluorescence spectrometer, the method comprising:
    measuring an elemental composition of the metal coating, the alloy coating, the metal substrate, or the alloy substrate using the X-ray fluorescence (XRF) spectrometer; and
    obtaining the average thickness of the metal coating or the alloy coating using a calibration relationship between a metal coating thickness or an alloy coating thickness and an elemental composition of the metal coating, the alloy coating, the metal substrate, or the alloy substrate.

2. The method of claim 1, wherein the metal coating or the alloy coating is a metal coating or an alloy coating of a plurality of outer armor wires wrapped around a cable.

3. The method of claim 2, wherein the cable is a wellbore wireline cable.

4. The method of claim 1, wherein the calibration relationship is a relationship between the metal coating thickness or the alloy coating thickness and a concentration of an element in the metal coating or the alloy coating.

5. The method of claim 1, wherein the calibration relationship is a relationship between the metal coating thickness or the alloy coating thickness and a ratio between a concentration of an element in the metal coating or the alloy coating and a concentration of an element in the metal substrate or the alloy substrate.

6. The method of claim 1, wherein the metal coating or the alloy coating comprises zinc.

7. The method of claim 6, wherein the calibration relationship is a relationship between the metal coating thickness or the alloy coating thickness and a ratio between a concentration of zinc in the metal coating or the alloy coating and a concentration of an element in the metal substrate or the alloy substrate.

8. The method of claim 7, wherein the metal substrate or the alloy substrate comprises iron, and the calibration relationship is a relationship between the metal coating thickness or the alloy coating thickness and a ratio between the concentration of zinc in the metal coating or the alloy coating and a concentration of iron in the metal substrate or the alloy substrate.

9. A method for analyzing a metal coating or an alloy coating of a plurality of outer armor wires wrapped around a cable using X-ray fluorescence (XRF) spectrometry, the method comprising:
    measuring an elemental composition of the metal coating or the alloy coating using an XRF spectrometer at a plurality of locations along the cable;
    obtaining an average thickness of the metal coating or the alloy coating at the plurality of locations along the cable using a calibration relationship between a metal coating thickness or an alloy coating thickness and an elemental composition of the metal coating or the alloy coating;
    comparing the average thickness of the metal coating or the alloy coating at the plurality of locations along the cable with a predetermined threshold; and
    deciding whether to service the cable, which of the plurality of locations along the cable to service, or when to service the cable.

10. The method of claim 9, wherein the metal coating or the alloy coating comprises zinc, and the calibration relationship is a relationship between the metal coating thickness or the alloy coating thickness and a concentration of zinc in the metal coating or the alloy coating.

11. The method of claim 9, wherein the plurality of outer armor wires comprises a metal coating or an alloy coating around a metal substrate or an alloy substrate, and the metal coating or the alloy coating comprises zinc, and the metal substrate or the alloy substrate comprises iron.

12. The method of claim 11, wherein the calibration relationship is a relationship between the metal coating thickness or the alloy coating thickness and the ratio between a concentration of zinc in the metal coating or the alloy coating and a concentration of iron in the metal substrate or the alloy substrate.

13. A method for analyzing a corrosive environment using an X-ray fluorescence (XRF) spectrometer, the method comprising:
    placing a test sample in the corrosive environment for a predetermined length of time, the test sample comprising a metal coating or an alloy coating and a metal substrate or an alloy substrate;
    removing the test sample from the corrosive environment;
    measuring an elemental composition of the metal coating or the alloy coating using the X-ray fluorescence (XRF) spectrometer; and
    obtaining an average thickness of the metal coating or the alloy coating using a calibration relationship between a metal coating thickness or an alloy coating thickness and the elemental composition of the metal coating or the alloy coating.

14. The method of claim 13, wherein the metal coating or the alloy coating of the test sample comprises an uneven surface with different distances from a measurement window of the X-ray fluorescence (XRF) spectrometer.

15. The method of claim 14, wherein the test sample is a section of a cable with a plurality of outer armor wires wrapped thereon.

16. The method of claim 15, wherein the cable is a wellbore wireline cable and the corrosive environment is a corrosive downhole environment.

\* \* \* \* \*